Jan. 27, 1953 F. GUTHOERL 2,626,832
COLLAPSIBLE TRAILER
Filed Dec. 31, 1949
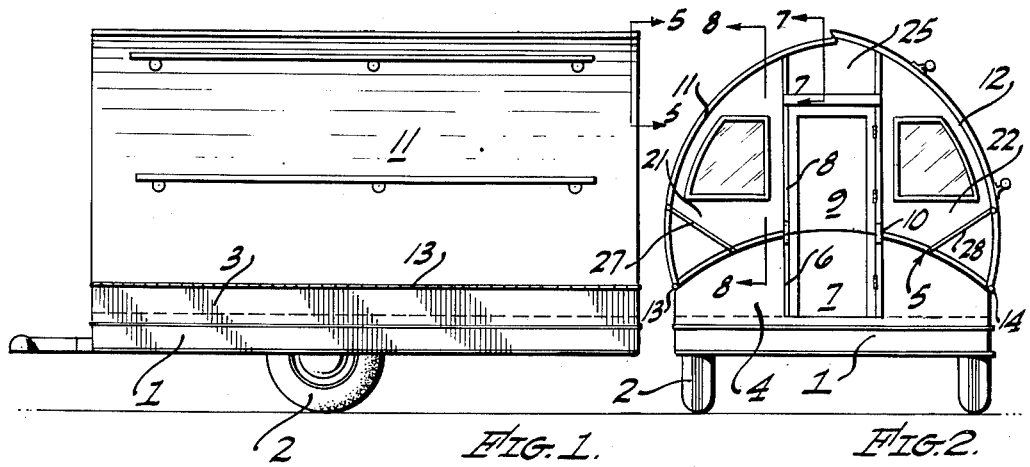
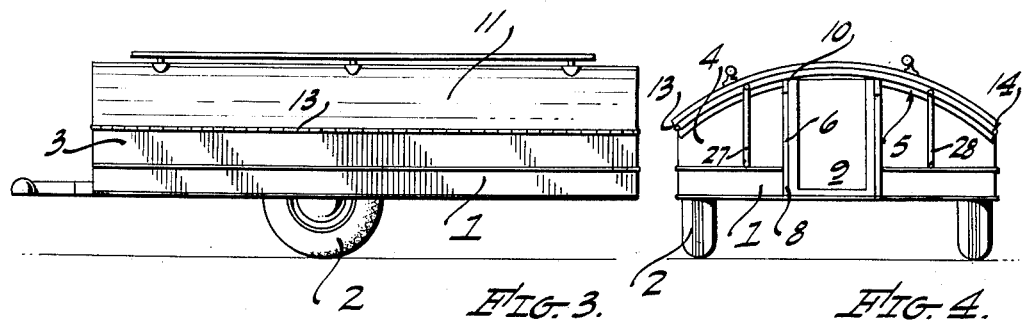
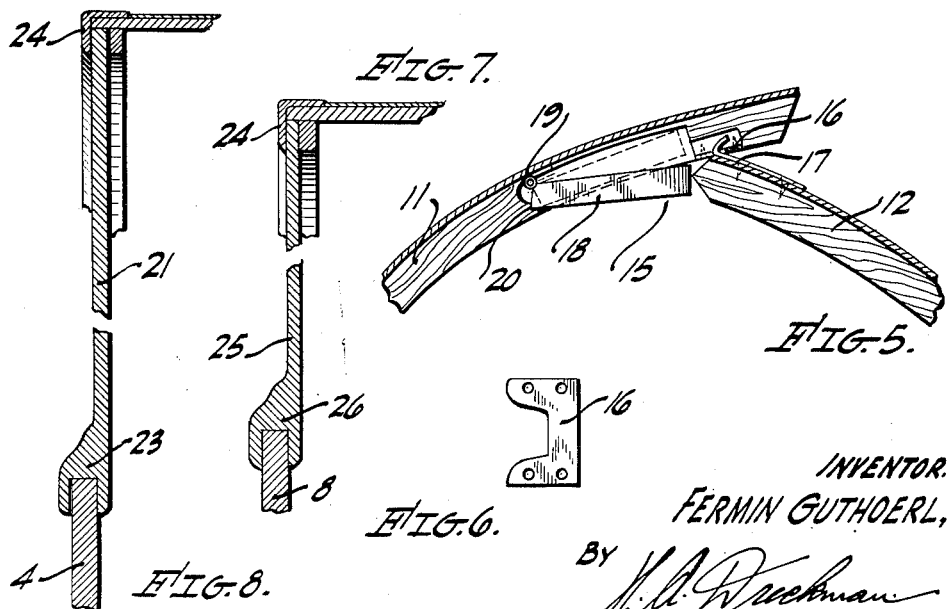
INVENTOR.
FERMIN GUTHOERL,
BY
ATTORNEY.

Patented Jan. 27, 1953

2,626,832

UNITED STATES PATENT OFFICE 2,626,832

COLLAPSIBLE TRAILER

Fermin Guthoerl, Lynwood, Calif.

Application December 31, 1949, Serial No. 136,355

4 Claims. (Cl. 296—23)

This invention relates to a collapsible trailer of the type in which the sides can be folded so that the height of the trailer is materially reduced when in folded position.

An object of my invention is to provide a novel collapsible trailer in which there are two foldable sides of the trailer, these sides being arcuate in shape and the arches of the sides being materially flatter than a semi-circular arch.

Another object of my invention is to provide a novel collapsible trailer, including two foldable sides, each side being formed as a flat arch and the sides meeting at the center and are there latched in erected position.

Still another object of my invention is to provide a novel means of placing the ends of the trailer in position and fitting them so that they will be retained in proper position when the trailer is erected.

A feature of my invention resides in the ease with which the trailer can be either erected or folded, both of these operations being easily accomplished by a single person.

Other objects, advantages and features of invention may appear from the accompanying drawing, the subjoined detailed description and the appended claims.

In the drawing

Figure 1 is a side elevation of my collapsible trailer in erected position.

Figure 2 is a rear elevation of the same.

Figure 3 is a side elevation of my collapsible trailer in collapsed position.

Figure 4 is an end view of the same.

Figure 5 is a fragmentary enlarged sectional view taken on line 5—5 of Figure 1.

Figure 6 is a plan view of one of the latch plates.

Figure 7 is a fragmentary sectional view taken on line 7—7 of Figure 2.

Figure 8 is a fragmentary sectional view taken on line 8—8 of Figure 2.

Referring more particularly to the drawing, the numeral 1 indicates the usual trailer chassis, which is supported by two or more wheels 2. Relatively narrow side boards 3 rise from the chassis 1 and extend the length of the trailer.

A rear end structure 4, preferably formed of wood or metal, extends transversely of the trailer, and the upper edge of this end piece is curved, as shown at 5. The end piece 4 also includes a door frame 6, in which a swinging door 7 is mounted. The upper door frame 8 is hingedly connected to the frame 6, and the upper half of the door 9 is also hinged to the door 7. As shown in Figure 2, the door is full height and gives access to the trailer when said trailer is erected.

In folded position, the hinge 10 permits the upper half of the door 9, as well as the frame 8, to fold downwardly, as shown in Figure 4.

The sides 11—12 are each hingedly secured to the side members 3, by the piano hinges 13—14, respectively. The sides 11—12 are formed as a flatter arch than the comparable circular arch, and, consequently, the sides 11—12 meet at the center of the trailer at a definite angle. The purpose of this angular meeting of the sides 11—12 is to provide an effective means of latching the two halves together at the center line of the trailer and also to provide an overlapping of the two sides so as to form a more effective joint and to provide a structure which, when folded, will extend from one side of the trailer to the other, thus entirely enclosing the top of the trailer when folded and also reduce the overall height of the trailer when in folded position. The two sides, 11—12 are suitably latched together when erected by a latch structure 15, which may include a plate 16, secured to the side 11, and a hook 17, secured to the side 12. The hook 17 enters the plate 16, as shown, and is held against accidental removal by the bar 18, which is hinged at 19, and butts against the end of the side 12, as shown.

A bar 18 is held against excessive downward movement by a stop or shoulder 20, this shoulder properly aligning the bar so as to engage the side 12. By pushing the bar 18 upwardly to the dotted line position, Figure 5, the hook 17 can be removed from the plate 16 and at that time the two sides 11—12 can be lowered.

The ends of the trailer are enclosed in the following manner:

Considering first the rear end, in which the door structure 7—9 is positioned:

A pair of panels 21—22 are curved to fit the top of the end 4, and the bottom of each panel is bifurcated, as shown at 23, this bifurcation fitting the top of the end 4, as shown in Figure 8. A channel 24 on the side pieces 11 or 12, fit the upper edge of the panels 21 or 22, thus holding these panels in position, and also these panels serve to brace both ends of the sides 11—12, when erected. A small center section 25, above the door 7—9, fits in the same manner as panels 21 and 22, that is, the bifurcation 26 fits on top of the door frame 8 and the upper edge of the panel 25 fits into the channel 24, as shown in Figure 7.

The front of the trailer may be provided with similar detachable sections, or the sides may be suitably curved to form a curve instead of a straight face. A pair of braces 27—28 are used to hold the sides 11—12, respectively, in erected position, before the end structures 21—22—25 are positioned. Also, these braces serve to hold the sides 11—12 erected while these removable sections are being erected or removed.

Having described my invention, I claim:

1. A collapsible trailer comprising a rectangular floor, a side board rising from the floor on each side thereof and extending the length thereof, an end structure extending transversely of the trailer between said side boards, the upper edge of said end structure being convexly curved, a side panel hingedly attached to the top edge of each of said side boards, each side panel being wider transversely than half the width of the floor, each of said side panels being curved convexly, the radius of curvature of each side panel being greater than half the width of the floor, said sides meeting on the center line of the trailer and said meeting point forming an obtuse angle, and latch means on said side panels holding said sides together at the said meeting point, said side panels being hinged to fold downwardly on the top of the end structure, and the upper curved edge of said end structure conforming to the convex curve of the sides when said sides rest on said end structure.

2. A collapsible trailer comprising a rectangular floor, a side board rising from the floor on each side thereof and extending the length of the trailer, an end structure extending transversely of the trailer between said side boards, the top edge of the end structure being curved convexly, a side panel hingedly attached to the top edge of each of said side boards, each of said sides being curved convexly, the radius of curvature of each side panel being greater than half the width of the floor, said sides meeting on the center line of the trailer and said meeting point forming an obtuse angle, latch means on the side panels holding said side panels together at the center meeting point, said side panels being hinged to fold downwardly on the top of the end structure, and the upper curved edge of said end structure conforming to the curve of the sides when said sides rest on said end structure, a lower door frame in said end structure, an upper door frame hinged to said lower door frame, a lower door hingedly mounted in the lower door frame, an upper door hingedly mounted in the upper door frame, said lower and upper doors being hinged together, and end panels fitted between the upper door frame, the top of the end structure and the side panels.

3. A collapsible trailer comprising a rectangular floor, a side board rising from the floor on each side thereof and extending the length of the trailer, an end structure extending transversely of the trailer between said side boards, the top edge of the end structure being curved convexly, a side panel hingedly attached to the top edge of each of said side boards, each of said sides being curved convexly, the radius of curvature of each side panel being greater than half the width of the floor, said sides meeting on the center line of the trailer and said meeting point forming an obtuse angle, latch means on the side panels holding said side panels together at the center meeting point, said side panels being hinged to fold downwardly on the top of the end structure and the upper curved edge of said end structure conforming to the curve of the sides when said sides rest on said end structure, a pair of end panels forming the rear wall of the trailer, each end panel partly enclosing the rear of the trailer, a bifurcation on the bottom of each panel, said bifurcation fitting on the top edge of the end structure and displaceable by upward movement of the panel, and each side having a channel into which said end panels fit.

4. A collapsible trailer comprising a rectangular floor, a side board rising from the floor on each side thereof and extending the length of the trailer, an end structure extending transversely of the trailer between said side boards, the top edge of the end structure being curved convexly, a side panel hingedly attached to the top edge of each of said side boards, each of said sides being curved convexly, the radius of curvature of each side panel being greater than half the width of the floor, said sides meeting on the center line of the trailer and said meeting point forming an obtuse angle, latch means on the side panels holding said side panels together at the center meeting point, said side panels being hinged to fold downwardly on the top of the end structure and the upper curved edge of said end structure conforming to the curve of the sides when said sides rest on said end structure, a pair of end panels forming the rear wall of the trailer, each end panel partly enclosing the rear of the trailer, a bifurcation on the bottom of each panel, said bifurcation fitting on the top edge of the end structure and displaceable by upward movement of the panel, and each side having a channel into which said end panels fit, a center section positioned between said end panels, said center section having a bifurcation on the bottom thereof to fit on the top of the door frame, and displaceable by upward movement of the center section, said center section also fitting into the channels in the side panels.

FERMIN GUTHOERL.

REFERENCES CITED

The following references are of record in the file of this patent:

UNITED STATES PATENTS

| Number | Name | Date |
|---|---|---|
| 1,200,034 | Sachar | Oct. 3, 1916 |
| 1,241,342 | Chapman | Sept. 25, 1917 |
| 1,526,278 | Gilmore | Feb. 10, 1925 |
| 2,293,569 | Sonino | Aug. 18, 1942 |
| 2,496,055 | King | Jan. 31, 1950 |
| 2,567,516 | Jones | Sept. 11, 1951 |

FOREIGN PATENTS

| Number | Country | Date |
|---|---|---|
| 324,667 | Great Britain | Jan. 31, 1930 |